(12) United States Patent
Kimura et al.

(10) Patent No.: US 8,637,190 B2
(45) Date of Patent: Jan. 28, 2014

(54) BATTERY UNIT

(75) Inventors: Kenji Kimura, Aichi-ken (JP);
Masahiro Tatsumisago, Sakai (JP);
Akitoshi Hayashi, Sakai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 735 days.

(21) Appl. No.: 12/550,447

(22) Filed: Aug. 31, 2009

(65) Prior Publication Data
US 2010/0075209 A1 Mar. 25, 2010

(30) Foreign Application Priority Data
Sep. 19, 2008 (JP) ................................. 2008-240882

(51) Int. Cl.
*H01M 10/0562* (2010.01)
(52) U.S. Cl.
USPC .......................................... 429/304; 429/209
(58) Field of Classification Search
None
See application file for complete search history.

(56) References Cited

U.S. PATENT DOCUMENTS

| 6,214,061 B1 * | 4/2001 | Visco et al. ................... 29/623.5 |
| 2003/0129457 A1 * | 7/2003 | Kawai et al. ...................... 429/7 |

FOREIGN PATENT DOCUMENTS

| JP | 2001176544 A | 6/2001 | |
| JP | 2004265685 A | 9/2004 | |
| JP | 2005285647 A | 10/2005 | |
| JP | 2006012761 A | 1/2006 | |
| JP | 2006269345 A | 10/2006 | |
| JP | 2008103292 A | 5/2008 | |
| WO | WO 2006/059794 A2 * | 6/2006 | ............ H01M 10/36 |

OTHER PUBLICATIONS

Machine translation of JP2006-012761 A1.*

* cited by examiner

*Primary Examiner* — Maria J Laios
(74) *Attorney, Agent, or Firm* — Gifford, Krass, Sprinkle, Anderson & Citkowski, P.C.

(57) ABSTRACT

A battery unit includes a battery assembly. The battery assembly includes a glass ceramic and a positive-side active material constituting a first composite layer, a glass ceramic and a negative-side active material constituting a second composite layer, and a solid-state electrolyte layer located between the first composite layer and the second composite layer. The battery unit also includes a case in which the battery unit is stored, a load sensor provided on the case, and a clamp member clamping the case and the load sensor.

5 Claims, 5 Drawing Sheets

BATTERY UNIT

This nonprovisional application is based on Japanese Patent Application No. 2008-240882 filed on Sep. 19, 2008 with the Japan Patent Office, the entire contents of which are hereby incorporated by reference.

BACKGROUND OF THE INVENTION

1. Field of the Invention

The present invention relates to battery units, particularly a battery unit that allows sensing of a state of charge/discharge of a solid-state battery.

2. Description of the Background Art

Conventionally known batteries include an all solid state type battery, as disclosed in Japanese Patent Laying-Open No. 2004-265685, for example.

Japanese Patent Laying-Open No. 2004-265685 teaches that a raw material including lithium sulfide with a crystal particle size of 140 nm or less is used as a starting raw material in producing lithium ion conductive sulfide glass. The raw material is vitrified by mechanical milling.

Then, the lithium ion conductive sulfide glass is fired at a temperature equal to or higher than the glass transition temperature to produce lithium ion conductive sulfide glass ceramic.

A battery that allows measurement of the remaining capacity of the battery is disclosed in Japanese Patent Laying-Open No. 2005-285647, for example. The battery includes a lithium ion secondary battery, a pressure sensor stacked on the lithium ion secondary battery, and a clamp member clamping the lithium ion secondary battery and pressure sensor from both sides in the stacking direction thereof.

In the event of the lithium ion secondary battery being expanded/shrunk by charging/discharging, the force applied to the pressure sensor is altered accordingly. Change in the volume of the lithium ion secondary battery is detected as the output value from the pressure sensor.

In a state estimation system of a secondary battery disclosed in Japanese Patent Laying-Open No. 2006-12761, each secondary battery cell includes a positive electrode and a negative electrode stored in a casing.

A temperature sensor is disposed between binding plates, affixed integrally with the secondary battery cell. The temperature sensor is arranged to allow sensing of the temperature of the positive electrode and negative electrode for at least one secondary battery cell. An ECU (Electronic Control Unit) provides the state of charge (SOC) of the secondary battery based on the pressure detected value from a pressure sensor and a temperature detected value from the temperature sensor, taking advantage of the volume changing property of the electrode in response to the temperature.

An overvoltage detection device disclosed in Japanese Patent Laying-Open No. 2006-269345 includes a laminate coat battery formed of a lithium ion secondary battery stacked in the thickness direction, and a pressure sensor inserted between the stacked surfaces of adjacent laminate coat batteries in a stacked body of the laminate coat batteries.

Determination is made as to whether overvoltage is generated or not at the laminate coat battery depending upon whether the contact pressure detected by measuring the pressure (contact pressure) acting on the stacking surface exceeds a threshold value or not.

The sodium sulfur secondary battery disclosed in Japanese Patent Laying-Open Nos. 2005-285647 and 2001-176544 includes a solid-state electrolyte with conductivity of sodium ions, a positive-side active material formed of sulfur or sodium polysulfide, stored in a positive-side chamber, a negative-side active material formed of sodium, stored in a negative-side chamber, and means for measuring the amount of molten sodium present in the negative-side vessel. The amount of sodium and change in the fluid level caused by the flow of sodium ions into or out from the positive-side chamber during charging/discharging are measured to obtain the depth of discharging of the battery. Specifically, an electron conduction circuit is formed in the negative-side vessel to identify change in the fluid level by the modification of the electron resistance, and/or measure the pressure change in the negative-side vessel to identify change in the amount of sodium.

The battery disclosed in Japanese Patent Laying-Open No. 2004-265685 is disadvantageous in that press-formability is poor since the lithium ion conductive glass ceramic corresponds to crystallized powder.

The battery disclosed in Japanese Patent Laying-Open No. 2005-285647 includes a negative-side active material and positive-side active material as well as a conduction additive in granular form, exhibiting gaps between the particles. When the battery is expanded or shrunk by the charging or discharging of the battery, the particles of the negative-side active material, the positive-side active material, and the conduction additive of the lithium ion secondary battery are rearranged.

Accordingly, a proper correlative relationship cannot be found between the state of charge and the volume change of the lithium ion secondary battery. The battery of Japanese Patent Laying-Open No. 2004-265685 was disadvantageous in that the state of charge of the lithium ion secondary battery cannot be identified correctly.

Similarly, the state estimation system of a secondary battery disclosed in Japanese Patent Laying-Open No. 2006-12761 and the overvoltage detection device disclosed in Japanese Patent Laying-Open No. 2006-269345 cannot exhibit a proper correlative relationship between the state of charge and the volume of the secondary battery. The remaining capacity in the secondary battery could not be calculated correctly based on the output from the pressure sensor.

The method of measuring the depth of discharge of a battery disclosed in Japanese Patent Laying-Open Nos. 2005-285647 and 2001-176544 is disadvantageous in that it cannot be applied to a solid-state battery.

SUMMARY OF THE INVENTION

In view of the foregoing, an object of the present invention is to provide a battery unit including a composite layer and a solid-state battery, superior in formability, allowing correct identification of the state of charge.

A battery unit according to the present invention includes a solid-state battery, a case for storing the solid-state battery, a load sensor provided on the case, and a clamp member clamping the case and the load sensor. The solid-state battery includes a first composite layer having a glass ceramic formed by firing sulfide glass at a temperature higher than or equal to the glass transition point of sulfide glass and a positive-side active material, a second composite layer having a glass ceramic formed by firing sulfide glass at a temperature higher than or equal to the glass transition point of sulfide glass and a negative-side active material, and a solid-state electrolyte layer located between the first composite layer and second composite layer, and having a glass ceramic formed by firing sulfide glass at a temperature higher than or equal to the glass transition point of sulfide glass.

Preferably, the load sensor is provided on an outer surface of the case, located at a region in a stacking direction of the first composite layer, second composite layer and solid-state electrolyte layer.

Preferably, the battery unit further includes a control unit having output reference data stored in advance. The output reference data is obtained by measuring the output from the load sensor with respect to the state of charge of the battery unit. The control unit detects the state of charge of the solid-state battery based on the output from the load sensor and the output reference data.

Preferably, the battery unit further includes a temperature sensor that can measure the temperature of the solid-state battery. The control unit has temperature load data stored in advance. The temperature load data is obtained by measuring the thermal load generated between the case and the load sensor caused by the temperature of the solid-state battery. The control unit detects the state of charge of the solid-state battery based on the output from the load sensor, the output from the temperature sensor, the output reference data, and the temperature load data.

Preferably, the battery unit further includes a voltage sensor that can measure the voltage of the solid-state battery. The control unit has charge voltage data and charge load data stored in advance. The charge voltage data is obtained by measuring the output of the voltage sensor when charging of the solid-state battery is completed. The charge load data is obtained by measuring the output of the load sensor when charging is completed. The control unit senses when charging of the solid-state battery is completed based on the output from the voltage sensor and the charge voltage data. The control unit senses a degraded state of the solid-state battery based on the output of the load sensor when charging is completed, and the charge load data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A battery unit 400 according to an embodiment of the present invention and a vehicle incorporating this battery unit 400 will be described hereinafter with reference to FIGS. 1-6.

In the embodiment set forth below, the reference of numbers, amounts and the like are not intended to limit the scope of the invention, unless otherwise specified. Further, in the embodiment set forth below, each component is not necessarily mandatory in the present invention, unless otherwise specified. Moreover, when there are a plurality of embodiments set forth below, it is expected that the feature of each of the embodiments can be combined appropriately, unless otherwise specified.

In the following description, the same components have the same reference characters allotted. Their designation and function are also identical. Therefore, details thereof will not be repeated.

Figure 1:
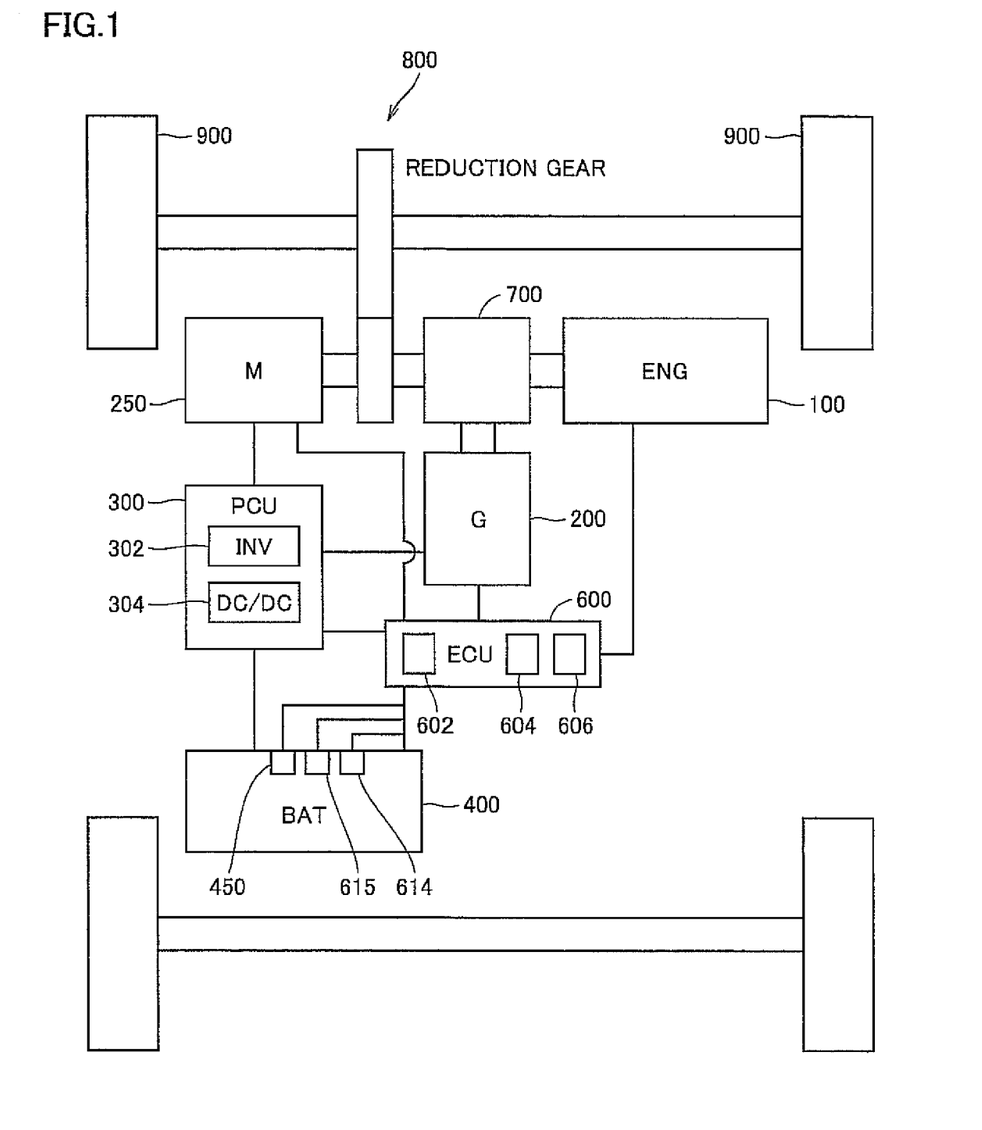
FIG. 1 is a schematic diagram representing a configuration of a hybrid vehicle.

Referring to FIG. 1, a hybrid vehicle incorporating battery unit 400 and the like according to an embodiment of the present invention includes an engine 100, a power generator 200, a PCU (Power Control Unit) 300, battery unit 400, a motor 250, and a hybrid ECU (Electronic Control Unit) 600 connected to all the cited elements. The control device according to an embodiment of the present invention is realized by hybrid ECU 600.

The power generated by engine 100 is split into two paths by a power split device 700. One of the two paths is directed to driving a wheel 900 via a reduction gear 800, whereas the other is directed to driving power generator 200 to generate power.

Power generator 200 generates power based on the power from engine 100 distributed by power split device 700. The electric power generated by power generator 200 is selectively used according to the vehicle operating state and the SOC (State of Charge) of battery unit 400. For example, in a general running mode or rapid acceleration mode, the electric power generated by power generator 200 is used directly to drive motor 250. In the case where the SOC of battery unit 400 is lower than a predetermined value, the electric power generated by power generator 200 is converted into direct current from alternating current by an inverter 302 of PCU 300, adjusted in voltage by a converter 304, and then stored in battery unit 400.

Motor 250 is driven by at least one of the electric power stored in battery unit 400 and the electric power generated by power generator 200. The driving force of motor 250 is transmitted to wheel 900 via reduction gear 800. Accordingly, motor 250 functions to assist engine 100, and/or move the car by the driving force from motor 250.

In a regenerative braking mode of the hybrid vehicle, motor 250 is driven by wheel 900 via reduction gear 800 such that motor 250 operates as a power generator. Accordingly, motor 250 functions as a regenerative brake converting the brake energy into electric power. The electric power generated by motor 250 is stored in battery unit 400 via inverter 302.

Hybrid ECU 600 includes a CPU (Central Processing Unit) 602, a memory 604, and a counter 606. CPU 602 carries out operation processing based on the vehicle operating state, the accelerator pedal position, the stepping amount of the brake pedal, the shift position, the SOC of battery unit 400, the map and program stored in memory 604, or the like. Accordingly, hybrid ECU 600 controls the elements incorporated in the vehicle to allow the vehicle to attain the desired driving state.

Figure 2:
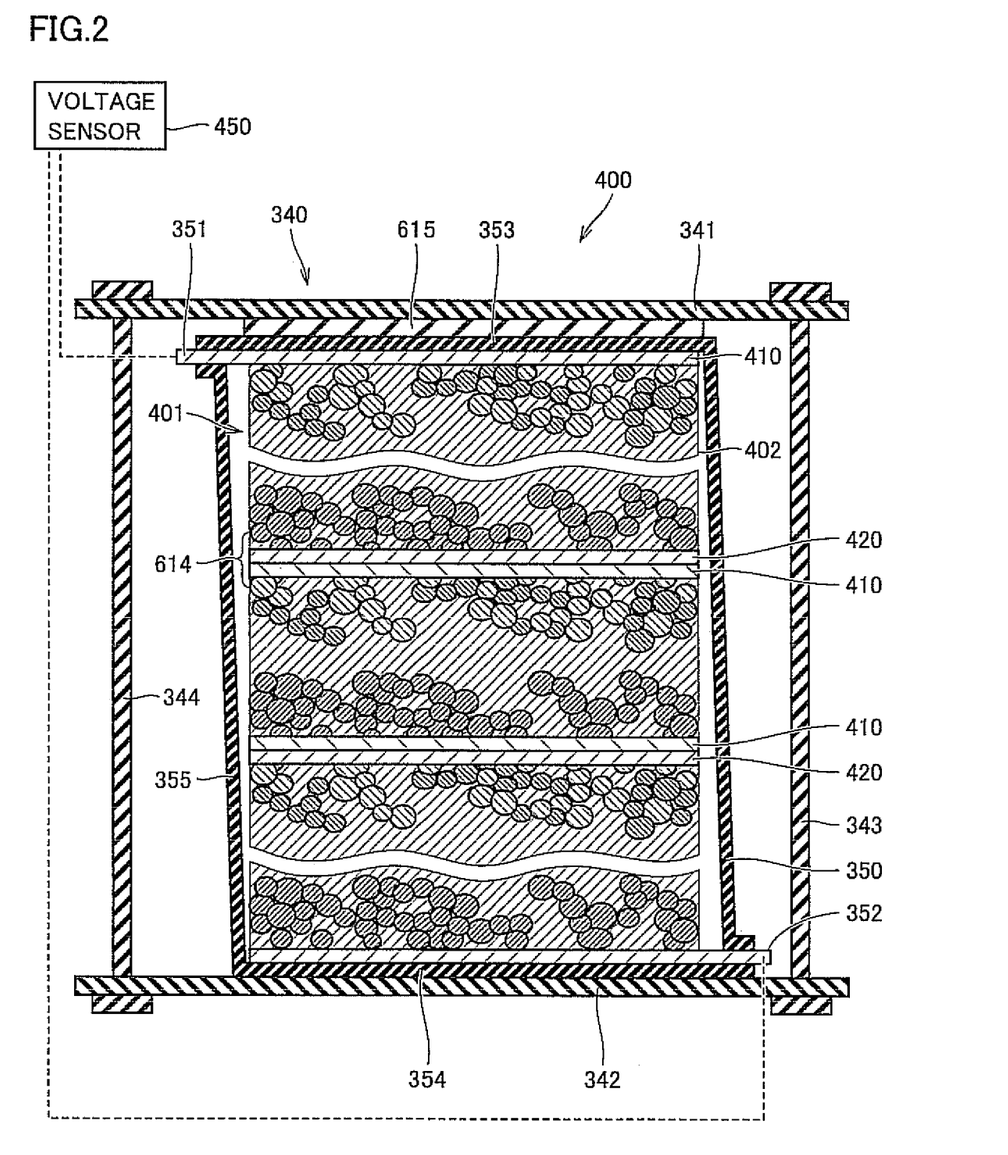
FIG. 2 is a sectional view of a battery unit.

FIG. 2 is a sectional view of battery unit 400. Referring to FIG. 2, battery unit 400 includes a battery assembly 401, a case 350 in which battery assembly 401 is stored, a load sensor 615 provided at case 350, and a clamp member 340 clamping load sensor 615 and case 350.

Battery unit 400 also includes a voltage sensor 450 that can measure the voltage of unit cell 402, and a battery temperature sensor 614 that can measure the temperature of case 350 or battery assembly 401.

Battery assembly 401 is formed by stacking, for example, a plurality of unit cells 402.

Case 350 includes a ceiling 353, a side 355 extending perpendicular from the edge of ceiling 353, and a bottom 354 joining the lower end of side 355.

The inner surface of ceiling 353 is brought into contact with the top face of battery assembly 401. Battery assembly 401 is mounted on bottom 354. Unit cells 402 are sequentially stacked from bottom 354 such that the upper end of battery assembly 401 forms contact with ceiling 353. The region of case 350 located in the stacking direction of unit cells 402 forms contact with battery assembly 401. In the example shown in FIG. 2, the inner surface of side 355 of case 350 is spaced apart from the perimeter face of battery assembly 401, though not to be taken by way of limitation. The perimeter face of battery assembly 401 may be brought into contact with side 355 of case 350. Case 350 includes an opening through which terminals 351 and 352 of battery assembly 401 are drawn out.

Load sensor 615 is mounted on ceiling 353 of case 350. Clamp member 340 clamps case 350 and load sensor 615. Specifically, clamp member 340 includes a ceiling portion 341 located at the side opposite to ceiling 353 with respect to load sensor 615, and a bottom portion 342 located at the side opposite to battery assembly 401 with respect to bottom 354 of case 350.

Clamp member 340 includes posts 343 and 344. Ceiling portion 341 and bottom portion 342 are biased to become closer to each other by means of posts 343 and 344. Accordingly, load sensor 615 and case 350 are clamped by ceiling portion 341 and bottom portion 342.

The pushing of ceiling portion 341 and bottom portion 342 of clamp member 340 against ceiling 353 and bottom 354 of case 350 causes favorable contact between unit cells 402 to reduce the contact resistance therebetween.

Although load sensor 615 is attached to ceiling 353 herein, the arrangement of load sensor 615 is not limited thereto, and is arbitrary as long as load sensor 615 is arranged on an outer surface of case 350, located at a region in a stacking direction of unit cells (solid type battery) 402 with respect to battery assembly 401.

Figure 3:
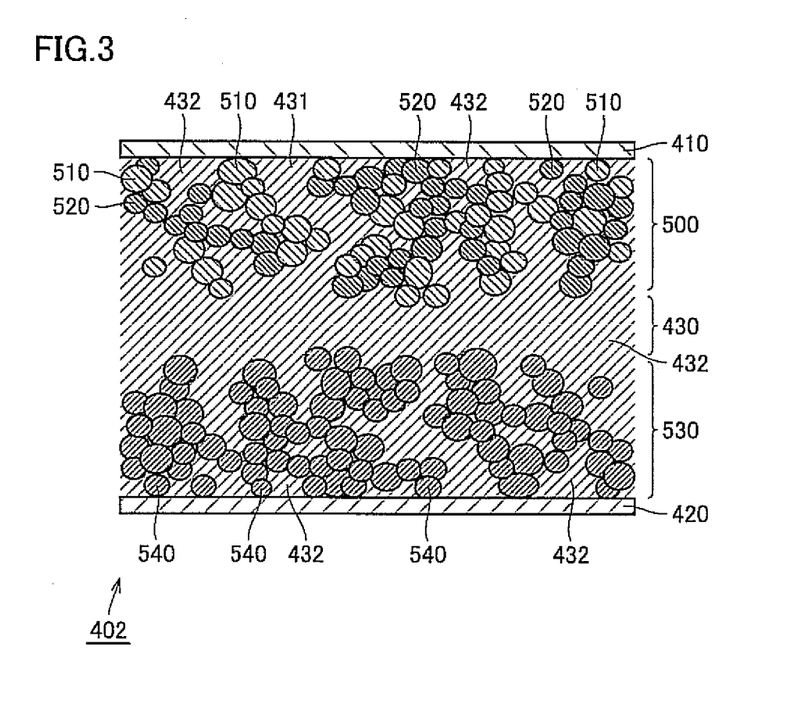
FIG. 3 is a sectional view of a unit cell according to an embodiment of the present invention.

FIG. 3 is a sectional view of a unit cell 402 according to an embodiment of the present invention. Referring to FIG. 3, unit cell 402 includes a positive-side collector 410, a positive-side composite layer 500 in contact with positive-side collector 410, a solid-state electrolyte layer 430 in contact with positive-side composite layer 500, a negative-side composite layer 530 in contact with solid-state electrolyte layer 430, and a negative-side collector 420 in contact with negative-side composite layer 530. Positive-side collector 410 and negative-side collector 420 are formed of metal such as aluminium, copper, or the like. Positive-side collector 410, positive-side composite layer 500, solid-state electrolyte layer 430, negative-side composite layer 530, and negative-side collector 420 are sequentially stacked to constitute unit cell 402.

Each of unit cells 402 is stacked in a direction identical to the stacking direction of positive-side collector 410, positive-side composite layer 500 and the like to constitute battery assembly 401.

Positive-side composite layer 500 includes a positive-side active material 510, a conduction additive 520 arranged adjacent to positive-side active material 510, and a glass ceramic 432 surrounding positive-side active material 510 and conduction additive 520. Sulfide glass 431 may be provided around positive-side active material 510 and conduction additive 520. This glass ceramic 432 is obtained by firing sulfide glass, and has conductivity of lithium ions higher than that of sulfide glass.

Sulfide glass 431 is obtained by mixing and heat-melting $SiS_2$, phosphorus pentasulfide ($P_2S_5$), $P_2S_3$ and the like that are glass forming materials with lithium sulfide ($Li_2S$) that is a glass modifier, followed by rapid cooling. The method by which lithium sulfide ($Li_2S$) constituting sulfide glass 431 is produced is arbitrary, and any lithium sulfide may be used without particular limitation as long as it has been industrially produced for sale.

The grain size of lithium sulfide is also not particularly limited. Sulfide glass 431 may be produced by using lithium sulfide as the starting material and a mixture of phosphorus pentasulfide or a mixture of phosphorus simple substance and sulfur simple substance instead of phosphorus pentasulfide, vitrified by mechanical milling.

For positive-side active material 510, lithium cobalt oxide ($LiCoO_2$), for example, may be used. For conduction additive 520, graphite, for example, may be used.

Solid-state electrolyte layer 430 formed between positive-side composite layer 500 and negative-side composite layer 530 is constituted of glass ceramic 432 as a solid-state electrolyte. Sulfide glass 431 may remain in positive-side active material 510.

Negative-side composite layer 530 includes a negative-side active material 540, and glass ceramic 432 surrounding negative-side active material 540. Sulfide glass 431 may remain around negative-side active material 540. Positive-side active material 510 or negative-side active material 540 includes at least one compound selected from the group consisting of $\alpha$-$Fe_2O_3$, $Li_4Ti_5O_{12}$, $LiCoO_2$, and $LiNi_{0.5}Mn_{0.5}O_2$.

The provision of conduction additive 520 in positive-side composite layer 500 is not mandatory. Further, negative-side composite layer 530 may include, although not included in the present embodiment, a conduction additive.

Figure 4:
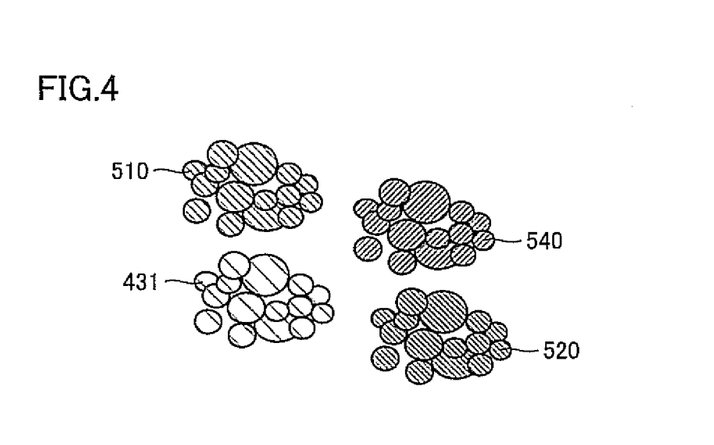
FIGS. 4 and 5 are diagrams to describe a fabrication method of the unit cell of FIG. 3.
Figure 5:
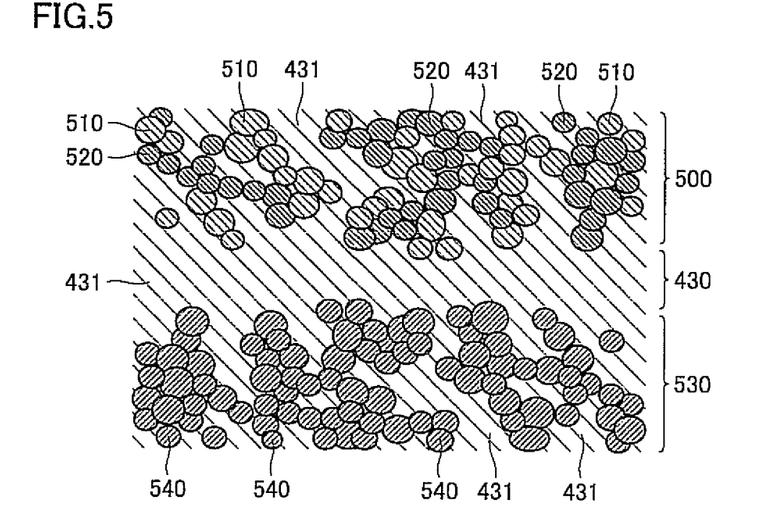

A method of fabricating the battery of FIG. 3 will be described hereinafter. FIGS. 4 and 5 are directed to describing the fabrication method of unit cell 402 shown in FIG. 3. Referring to FIG. 4, positive-side active material 510, negative-side active material 540, sulfide glass 431, and conduction additive 520 are prepared as the raw material.

Referring to FIG. 5, positive-side active material 510, conduction additive 520 and sulfide glass 431 are mixed and press-formed to constitute positive-side composite layer 500. Additionally, negative-side active material 540 and sulfide glass 431 are mixed and press-formed to constitute negative-side composite layer 530. The region between positive-side composite layer 500 and negative-side composite layer 530 is filled with sulfide glass 431. Positive-side composite layer 500, solid-state electrolyte layer 430, and negative-side composite layer 530 are fired to segregate superionic conduction crystals to sulfide glass 431 to form glass ceramic.

Specifically, sulfide glass was obtained by processing (mechanical milling) the mixed powder of $Li_2S$ and $P_2S_5$ at the molar ratio of 80:20, for example, for twenty hours by planetary ball mill.

The positive-side composite was obtained by mixing $LiCoO_2$, sulfide glass, and conduction additive (graphite) at the weight ratio of 40:60:4. The negative-side composite was obtained by mixing graphite and sulfide glass at the weight ratio of 1:1.

The negative-side composite, sulfide glass, and the positive-side composite were sequentially introduced into a circular mold of 10 mm in diameter, allowing press-forming, followed by applying pressure at 400 MPa to obtain a circular pellet.

By firing the circular pellet obtained as set forth above for several hours in the vicinity of the glass transition point of sulfide glass (approximately 200.degree. C.), glass ceramic was obtained. In addition, it is appreciated from FIG. 5 that the positive-side active material 510, conduction additive 520 and negative-side active material 540 are encapsulated within the sulfide glass 431. As such, a single unit having the solid-state electrolyte layer 430 between the positive-side composite layer 500 and the negative-side composite layer 530 is produced.

In the case where glass sulfide is intended to remain, the retention time is adjusted according to the reaction progressing rate of sulfide glass at a relevant temperature identified in advance. The remaining amount of sulfide glass may be 30%, for example, depending upon the ion conductivity of the sulfide glass ions.

The mechanism of volume variation at unit cell 402 and battery assembly 401, constituted as set forth above, by the charging and discharging of unit cell 402 and battery assembly 401 will be described hereinafter. $LiCoO_2$ includes a Co—O layer 170 formed in layers, and Li located between each of Co—O layers 170. Li outputs charge to readily attain $Li^+$, and Co—O layer 170 is readily charged negative.

When unit cell 402 (battery assembly 401) is charged, $Li^+$ migrates from positive-side active material 510 towards negative-side collector 420.

With the progress of charging, the particles of positive-side active material 510 expand.

This expansion of positive-side active material 510 corresponds to increase in the thickness of each unit cell 402. The stacking direction of positive-side composite layer 500, solid-state electrolyte layer 430 and negative-side composite layer 530 in each unit cell 402 matches the stacking direction of unit cells 402. As the thickness of each unit cell 402 increases, battery assembly 401 accordingly becomes thicker in the stacking direction.

Increase of the thickness of battery assembly 401 in the stacking direction of unit cells 402 in FIG. 1 causes battery assembly 401 to push against ceiling 353 and bottom 354 of case 350. At this stage, clamp member 340 is clamping ceiling 353 and bottom 354 of case 350 via load sensor 615. Expansion of battery assembly 401 and case 350 in the stacking direction of unit cells 402 causes increase in the load applied to load sensor 615 disposed between ceiling portion 341 of clamp member 340 and ceiling 353 of case 350.

In contrast, discharging at battery assembly 401 causes reduction in the grain size of positive-side active material 510. Accordingly, the thickness of battery assembly 401 is reduced in the stacking direction of unit cells 402. Therefore, the load applied to load sensor 615 becomes smaller.

In each unit cell 402, positive-side active material 510 and negative-side composite layer 530 are surrounded by glass ceramic 432. Solid-state electrolyte layer 430 is formed of glass ceramic 432 as well. Glass ceramic 432 does not take a granular form, and is substantially unitary. Thus, positive-side active material 510 and negative-side composite layer 530 are embedded in glass ceramic that is absent of flowability.

Accordingly, when the thickness of positive-side composite layer 500 changes, rearrangement or the like of the particles in negative-side composite layer 530 and solid-state electrolyte layer 430 is suppressed. The amount of change in the grain size of positive-side active material 510 caused by charging or discharging is accurately reflected as the change in the thickness of unit cell 402 and battery assembly 401.

Therefore, the state of charge of battery assembly 401 can be properly identified by sensing the load applied to load sensor 615. It is to be noted that glass ceramic 432 exhibits low expansion characteristics in a wide range of temperature, and is also superior in thermal shock resistance. Glass ceramic 432 is less vulnerable to development of a defect such as a micro crack. Glass ceramic is known as a material less susceptible to defects. Therefore, glass ceramic 432 will not be easily damaged even if the thickness of positive-side active material 510 varies as a result of charging or discharging.

In the case where sulfide glass 431 is made to remain in the positive-side composite layer identified as a positive-side active material layer and negative-side composite layer 530 identified as a negative-side active material layer, the expansion and shrinkage of positive-side active material 510 can be absorbed to allow damage of the ion conduction path to be prevented. Therefore, the lifetime property can be improved. It is to be noted that the remaining amount of sulfide glass 431 is preferably less than or equal to 30% of sulfide glass 431 in order to identify the state of charge of battery assembly 401 correctly.

Figure 6:
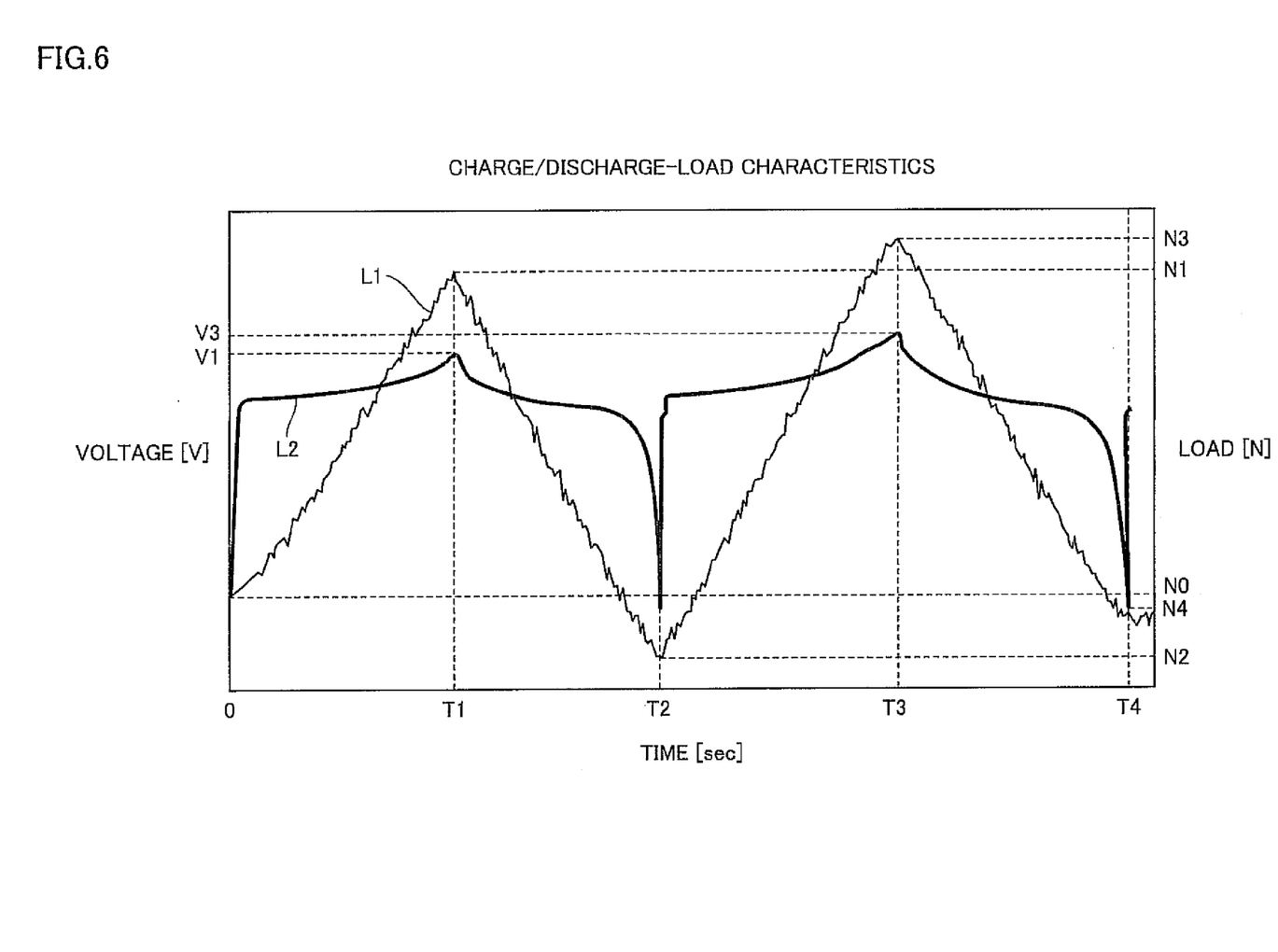
FIG. 6 is a graph representing the output of a voltage sensor and the output of a load sensor at the time of charging and discharging.

FIG. 6 is a graph representing the output of voltage sensor 450 and the output of load sensor 615 in a charging mode and discharging mode. In the graph of FIG. 6, the horizontal axis represents the time (T), the left vertical axis the voltage (V), and the right vertical axis the load (N). Graph L1 represents the result of load sensor 615. Graph L2 represents the output of voltage sensor 450. In the graph of FIG. 6, charging is carried out during the period of time 0 to T1 and time T2 to T3. Discharging is carried out during the period of time T1 to T2 and time T3 to T4. The initial state (T=0) corresponds to the state where battery assembly 401 is completely discharged.

It is appreciated from graph L1 in FIG. 6 that the voltage of battery assembly 401 rises when battery assembly 401 is charged. The output voltage of battery assembly 401 immediately returns to a predetermined level of voltage when battery assembly 401 begins to be charged from a discharged state. Immediately preceding the completion of charging battery assembly 401, the output voltage of battery assembly 401 rises to reach a predetermined peak value. For example, voltage V1 of battery assembly 401 at time T1 corresponding to the first completion of charging is substantially equal to voltage V2 of battery assembly 401 at time T2 corresponding to the second completion of charging.

As indicated by graph L1, it is appreciated that, when charging of battery assembly 401 is initiated, the load applied to load sensor 615 increases substantially in proportion to the charging time. When battery assembly 401 begins to be discharged, the load applied to load sensor 615 becomes lower in proportion to the discharging time.

The inclination of graph L1 during the first charging term 0 to T1 substantially matches the inclination of graph L1 during the second charging term T2 to T3. Further, the inclination of graph L1 during the first discharging term T1-T2 substantially matches the inclination of the second discharging term T3 to T4. It is to be noted that output load N1 at the first completion of charging (T1) substantially matches output load N3 at the second completion of charging (T3). Output load N3 is located within a range of ±5% the output load N1.

Moreover, output load N0 of load sensor 615 at the initial state, output load N2 at the first completion of discharging (T2), and output load N4 at the second completion of discharging (T4) substantially match. Output load N2 and output load N4 are both located in the range of ±5% the output load N0.

By sensing the output of load sensor 615, the state of charge of battery assembly 401 can be identified correctly.

From the graph of FIG. 6, the relationship between voltage V of unit cell 402 and output load N of load sensor 615, as indicated by equation (1) set forth below, is calculated.

$$V \text{ (voltage of unit cell 402)} = F(N) \quad (1)$$

Voltage calculation data and program corresponding to equation (1) are stored in memory 604 of FIG. 1. Equation (1) of the relationship set forth above may be an approximate expression.

In FIG. 2, battery unit 400 includes battery temperature sensor 614 that can measure the temperature of battery assembly 401.

Memory 604 has the characteristics of the temperature of battery assembly 401 and the load applied to load sensor 615 stored in advance.

Specifically, the load applied to load sensor 615 is sensed with the temperature of battery assembly 401 sequentially altered to set the correlative relationship between the temperature (K) of battery assembly 401 and the output load (N) of load sensor 615. In practice, the temperature (K) and output load (N) could be represented by a primary expression such as output load NT (output load of load sensor 615 by thermal stress)=A×K (output temperature of battery temperature sensor 614), where A is a constant.

Temperature load calculation data and program representing the relationship between the temperature (K) of battery assembly 401 and the output load (N) of load sensor 615 are stored in memory 604.

Usage of battery assembly 401 over a long period of time will cause a defect such as a crack at glass ceramic 432 in unit cell 402. A defect in glass ceramic 432 will render difficult the passage of $Li^+$ through glass ceramic 432. As a result, the battery capacity of battery assembly 401 in a charging mode will be reduced.

When a crack or the like is generated in glass ceramic 432 to cause glass ceramic 432 to be granulated, the change in the grain size of positive-side active material 510 due to charging or discharging is absorbed by the rearrangement of granular glass ceramic 432. As a result, the change in the thickness of battery assembly 401 in the stacking direction of unit cells 402 becomes smaller.

The output voltage of battery assembly 401 becomes lower when battery assembly 401 is degraded, leading to a longer charging time and reduction in the output load from load sensor 615.

Cycle testing on battery assembly 401 exhibited that the output load of battery assembly 401 in a discharging mode subsequent to the cycle testing was reduced by 5% with respect to output load NO of battery assembly 401 in the initial state. Further, the output load of battery assembly 401 in a state of charge subsequent to the cycle testing was reduced by approximately 20% with respect to output load N3 of battery assembly 401 in a state of charge at the initial state.

It was appreciated that the reduction rate of the battery capacity of battery assembly 401 subsequent to cycle testing substantially matches the reduction rate of the output load. It was also appreciated that degradation in battery assembly 401 causes a lower output voltage when charging is completed, and the amplitude width of the output load is reduced, as compared to battery assembly 401 in an initial state.

The threshold value of the amplitude of output load (N) of battery assembly 401, the threshold value for the average of output load (N), and the threshold value of the output load when charging is completed are stored as degradation state calculation data in memory 604.

When the vehicle is running, CPU 602 calculates the output load (NT) based on the thermal stress from the output temperature (K) from battery temperature sensor 614 and the temperature load calculation data stored in memory 604.

CPU 602 identifies a first state of charge of battery assembly 401 based on a load (N-NT) that is the calculated output load (NT) according to the thermal stress set forth above subtracted from the output load (N) output from load sensor 615, and the voltage calculation data stored in memory 604.

When the brake pedal is stepped down by the driver, for example, wheel rotation is suppressed by the regenerative braking in which motor 250 is driven as a power generator, and a braking operation by the brake mechanism.

At this stage, the ratio of the regenerative braking of motor 250 and the ratio of the braking by the brake mechanism are determined based on the calculated state of charge of battery assembly 401.

When the accelerator pedal is stepped down, CPU 602 determines the amount of distribution of the power to motor 250 and engine 100 upon identifying the accelerator pedal position and state of charge of battery assembly 401.

Further, CPU 602 provides the value of the load (N-NT) that is the subtraction of the output load (NT) based on the thermal stress from the output load to memory 604 for accumulation, and calculates the average and amplitude of the load (N-NT) based on the subtraction of output load (NT) corresponding to thermal stress.

CPU 602 then determines whether the amplitude of the load (N-NT) falls within the range of the threshold value of the amplitude of output load (N) stored in memory 604. When CPU 602 determines that the amplitude of the load (N-NT) is not within the range of the stored threshold value, a display is provided indicating that the battery is degraded on the display region on the meter panel or the like at the driver's seat.

Further, determination is made as to whether the load (N-NT) when charging is completed is within the range of the threshold value stored in memory 604.

In the event of CPU 602 determining that the load (N-NT) when charging is completed is not within the range of a predetermined threshold value, a display is provided indicating that the battery is degraded.

Further, CPU 602 determines as to whether the average of the load (N-NT) is within the range of the threshold value stored in memory 604. When CPU 602 determines that the average value is not within the threshold value range, a display is provided indicating that the battery is degraded.

Although the present embodiment was described based on a battery unit 400 incorporated in a hybrid vehicle, the present invention is not limited there. For example, the present invention is applicable to a plug-in vehicle, an electric car, or the like.

INDUSTRIAL FIELD OF APPLICATION

Thus, the present invention is suitable to a battery unit incorporated in a hybrid vehicle and the like.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A battery unit comprising:
   a solid-state battery including
      a first composite layer having a glass ceramic containing fired sulfide glass and a positive-side active material encapsulated within said fired sulfide glass,
      a second composite layer having a glass ceramic containing fired sulfide glass and a negative-side active material encapsulated within said fired sulfide glass,
      a solid-state electrolyte layer located between said first composite layer and said second composite layer, and having a glass ceramic having fired sulfide without containing a positive-side active material and a negative-side active material;
a case storing said solid-state battery;
a load sensor provided on said case; and
a clamp member clamping said case and said load sensor.
said first composite layer, second composite layer and solid-state electrolyte layer formed together as a single unit by firing said layers stacked together at a temperature higher than or equal to a glass transition point of said sulfide glass such that said positive-side active material and said negative-side active material are encapsulated within said sulfide glass.

2. The battery unit according to claim 1, wherein said load sensor is provided on an outer surface of said case, located at a region in a stacking direction of said first composite layer, said second composite layer, and said solid-state electrolyte layer.

3. The battery unit according to claim 1, further comprising a control unit storing in advance output reference data obtained by measuring an output of said load sensor with respect to a state of charge of said battery unit,
wherein said control unit detects the state of charge of said solid-state battery based on an output from said load sensor and said output reference data.

4. The battery unit according to claim 3, further comprising a temperature sensor that can measure a temperature of said solid-state battery, wherein
said control unit stores temperature load data in advance, obtained by measuring thermal load generated between said case and said load sensor by a temperature of said solid-state battery, and
said control unit detects the state of charge of said solid-state battery based on an output from said load sensor, an output from said temperature sensor, said output reference data, and said temperature load data.

5. The battery unit according to claim 3, further comprising a voltage sensor that can measure a voltage of said solid-state battery, wherein
said control unit stores in advance charge voltage data, obtained by measuring an output of said voltage sensor when charging of said solid-state battery is completed, and charge load data obtained by measuring an output of said load sensor when charging is completed,
said control unit senses when charging of said solid-state battery is completed based on an output from said voltage sensor and said charge voltage data,
said control unit senses a degraded state of said solid-state battery based on an output of said load sensor when charging is completed, and said charge load data.

* * * * *